United States Patent
Baheti et al.

(10) Patent No.: US 11,355,838 B2
(45) Date of Patent: Jun. 7, 2022

(54) INTEGRATION OF EBG STRUCTURES (SINGLE LAYER/MULTI-LAYER) FOR ISOLATION ENHANCEMENT IN MULTILAYER EMBEDDED PACKAGING TECHNOLOGY AT MMWAVE

(71) Applicant: Infineon Technologies AG, Neubiberg (DE)

(72) Inventors: Ashutosh Baheti, Munich (DE); Marwa Abdel-Aziz, Munich (DE); Mustafa Dogan, Unterhaching (DE); Muhammad Tayyab Qureshi, Neubiberg (DE); Saverio Trotta, Munich (DE); Maciej Wojnowski, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 270 days.

(21) Appl. No.: 16/356,316

(22) Filed: Mar. 18, 2019

(65) Prior Publication Data

US 2020/0303815 A1    Sep. 24, 2020

(51) Int. Cl.
*H01Q 13/10* (2006.01)
*H01Q 1/52* (2006.01)
(Continued)

(52) U.S. Cl.
CPC ............. *H01Q 1/526* (2013.01); *G01S 7/03* (2013.01); *G01S 7/282* (2013.01); *G01S 7/285* (2013.01);
(Continued)

(58) Field of Classification Search
CPC .... H01Q 1/526; H01Q 9/0407; H01Q 19/005; H01Q 1/3233; H01Q 1/525; H01Q 1/24;
(Continued)

(56) References Cited

U.S. PATENT DOCUMENTS

| 4,241,347 A | 12/1980 | Albanese et al. |
| 6,147,572 A | 11/2000 | Kaminski et al. |

(Continued)

FOREIGN PATENT DOCUMENTS

| CN | 1463161 A | 12/2003 |
| CN | 1716695 A | 1/2006 |

(Continued)

OTHER PUBLICATIONS

Choi, Wonsang et al., "Isolation Enhancement between Microstrip Patch Antennas using Dual-band EBG Structure without Common Ground Plane", IEEE Proceedings of the 2012 International Symposium on Antennas and Propagation, Jul. 8-14, 2012, 2 pages.

(Continued)

*Primary Examiner* — Minh D A

(74) *Attorney, Agent, or Firm* — Slater Matsil, LLP

(57) ABSTRACT

A packaged radar includes laminate layers, a ground plane associated with at least one of the laminate layers, a transmit antenna and a receive antenna associated with at least one of the laminate layers, and an electromagnetic band gap structure between the transmit antenna and the receive antenna for isolating the transmit antenna and the receive antenna, the electromagnetic band gap structure including elementary cells forming adjacent columns each coupled to the ground plane, and each elementary cell including a conductive planar element and a columnar element coupled to the conductive planar element.

22 Claims, 18 Drawing Sheets

(51) Int. Cl.

| | | |
|---|---|---|
| *G01S 7/03* | (2006.01) | |
| *G01S 7/282* | (2006.01) | |
| *G01S 7/285* | (2006.01) | |
| *G01S 13/32* | (2006.01) | |
| *H01Q 9/04* | (2006.01) | |
| *H01Q 19/00* | (2006.01) | |

(52) U.S. Cl.
CPC ........... *G01S 13/32* (2013.01); *H01Q 9/0407* (2013.01); *H01Q 19/005* (2013.01)

(58) Field of Classification Search
CPC ... H01Q 1/52; H01Q 1/48; H01Q 1/50; G01S 7/03; G01S 7/282; G01S 7/285; G01S 13/32
See application file for complete search history.

(56) References Cited

U.S. PATENT DOCUMENTS

| | | |
|---|---|---|
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0280900 A1 | 11/2012 | Wang et al. |
| 2012/0293279 A1* | 11/2012 | Gong ............... H01P 3/121 333/202 |
| 2012/0306705 A1* | 12/2012 | Sakurai ............... H04M 1/0241 343/702 |
| 2013/0027240 A1 | 1/2013 | Chowdhury |
| 2013/0027269 A1* | 1/2013 | Orime ................... H01Q 1/521 343/841 |
| 2013/0106673 A1 | 5/2013 | McCormack et al. |
| 2014/0028524 A1 | 1/2014 | Jerauld et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0029062 A1* | 1/2015 | Ng .................. H01Q 1/286 343/713 |
| 2015/0130673 A1* | 5/2015 | Ng .................. H01Q 9/0421 343/713 |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0028161 A1* | 1/2016 | Kawaguchi ............ H01Q 1/32 343/700 MS |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0087333 A1 | 3/2016 | Tong et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0141749 A1 | 5/2016 | Tagi et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2018/0277946 A1 | 9/2018 | Murata et al. |
| 2018/0296557 A1* | 10/2018 | Zhang .................... A61P 35/00 |

FOREIGN PATENT DOCUMENTS

| | | |
|---|---|---|
| CN | 101490578 A | 7/2009 |
| CN | 101585361 A | 11/2009 |

(56) References Cited

FOREIGN PATENT DOCUMENTS

| | | |
|---|---|---|
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011075725 A1 | 11/2012 |
| DE | 102014118063 A1 | 7/2015 |
| EP | 3096402 A1 | 11/2016 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler MultiRadar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

* cited by examiner

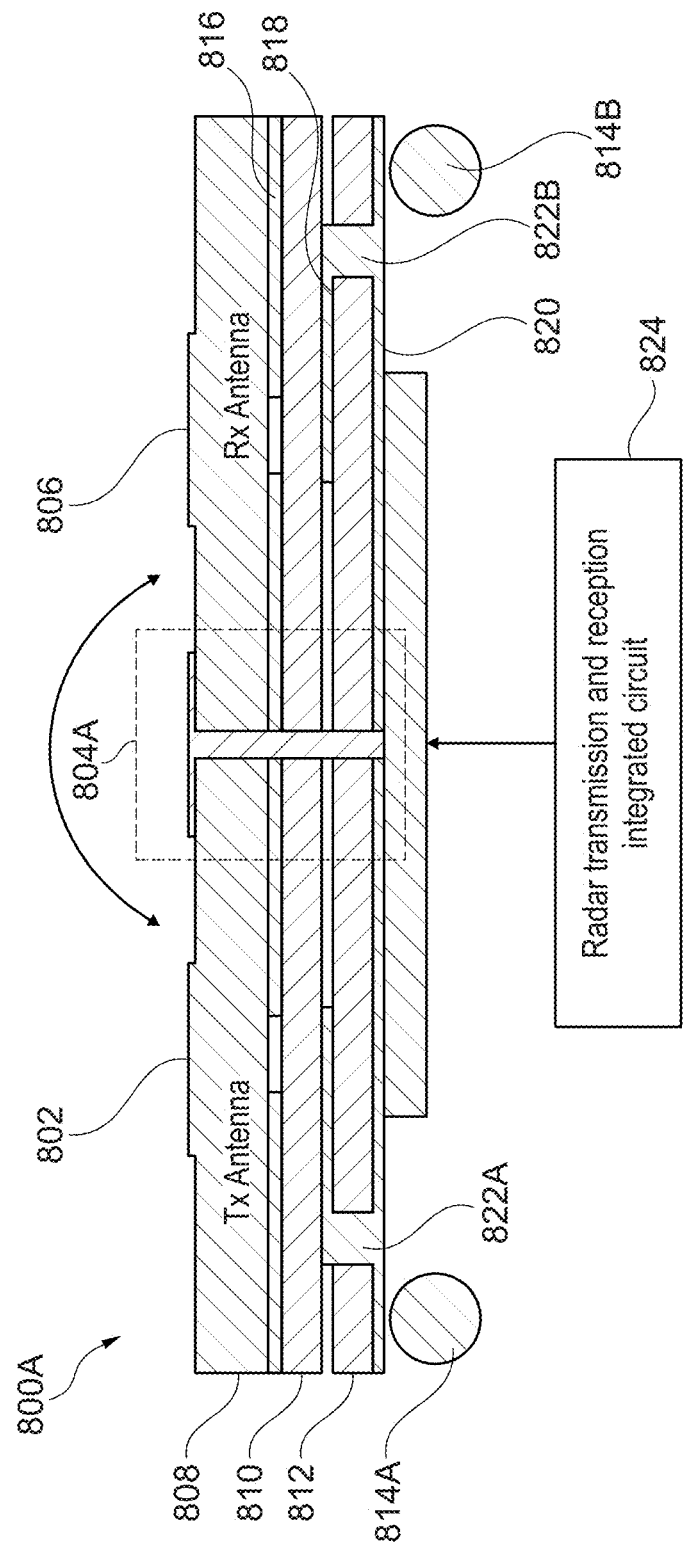

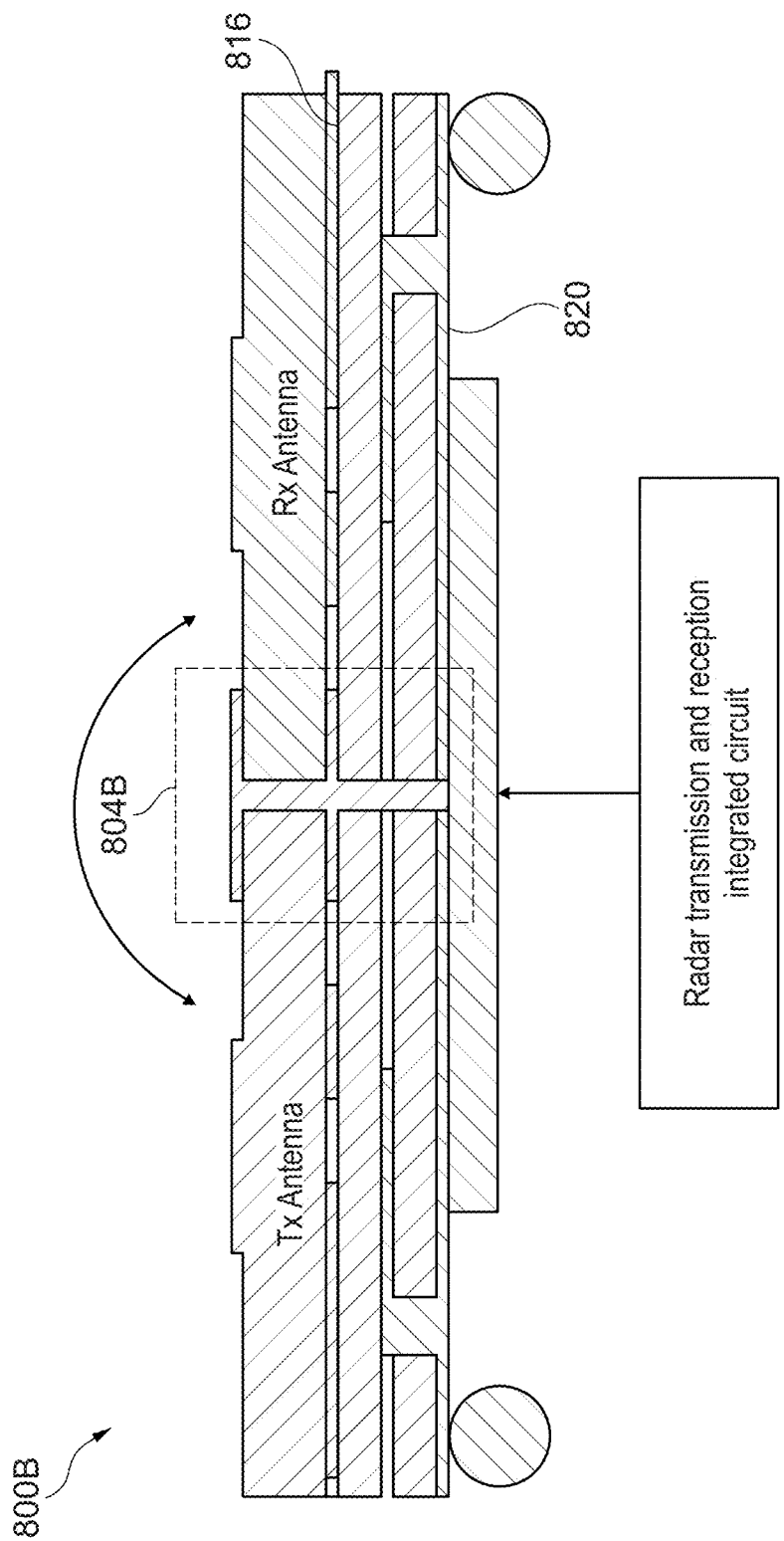

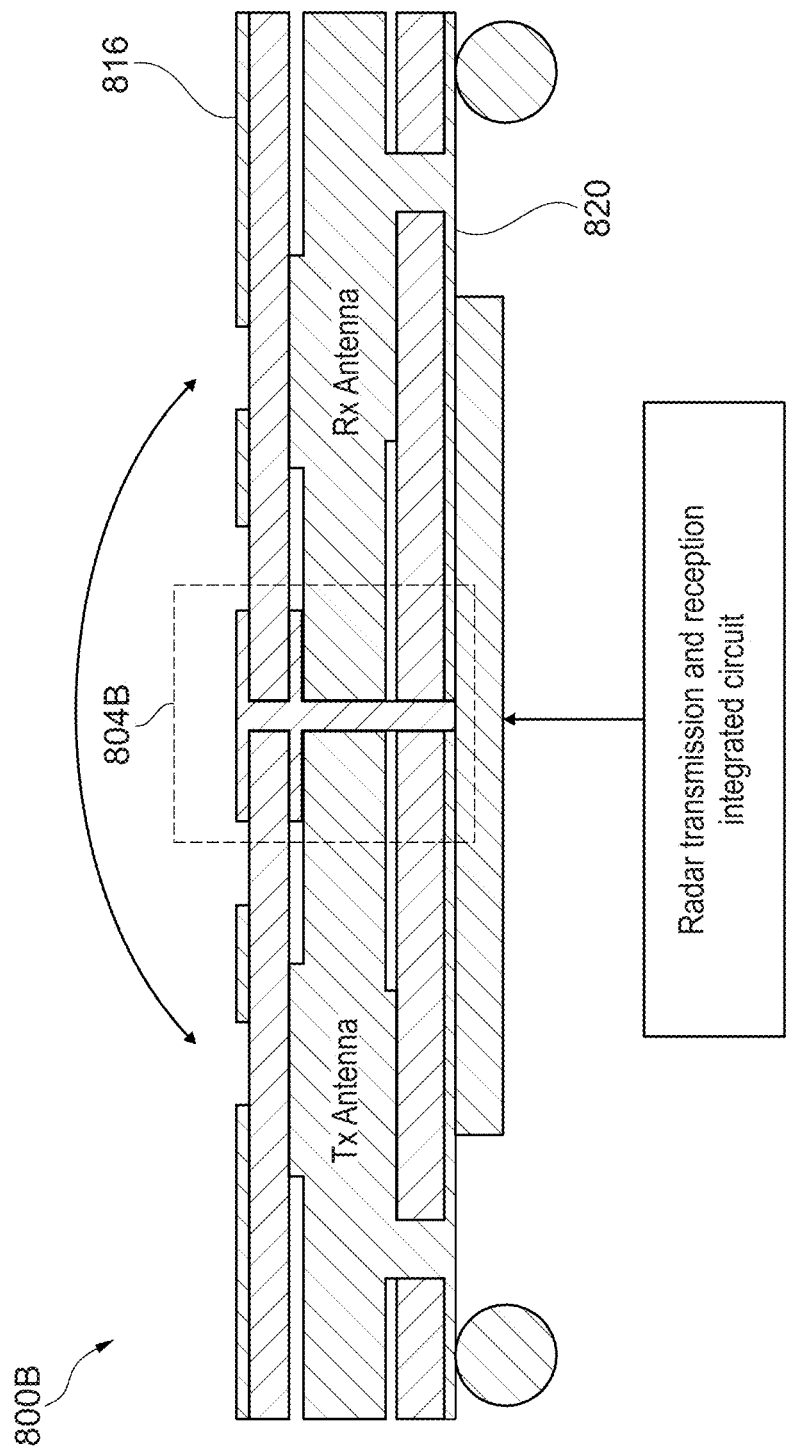

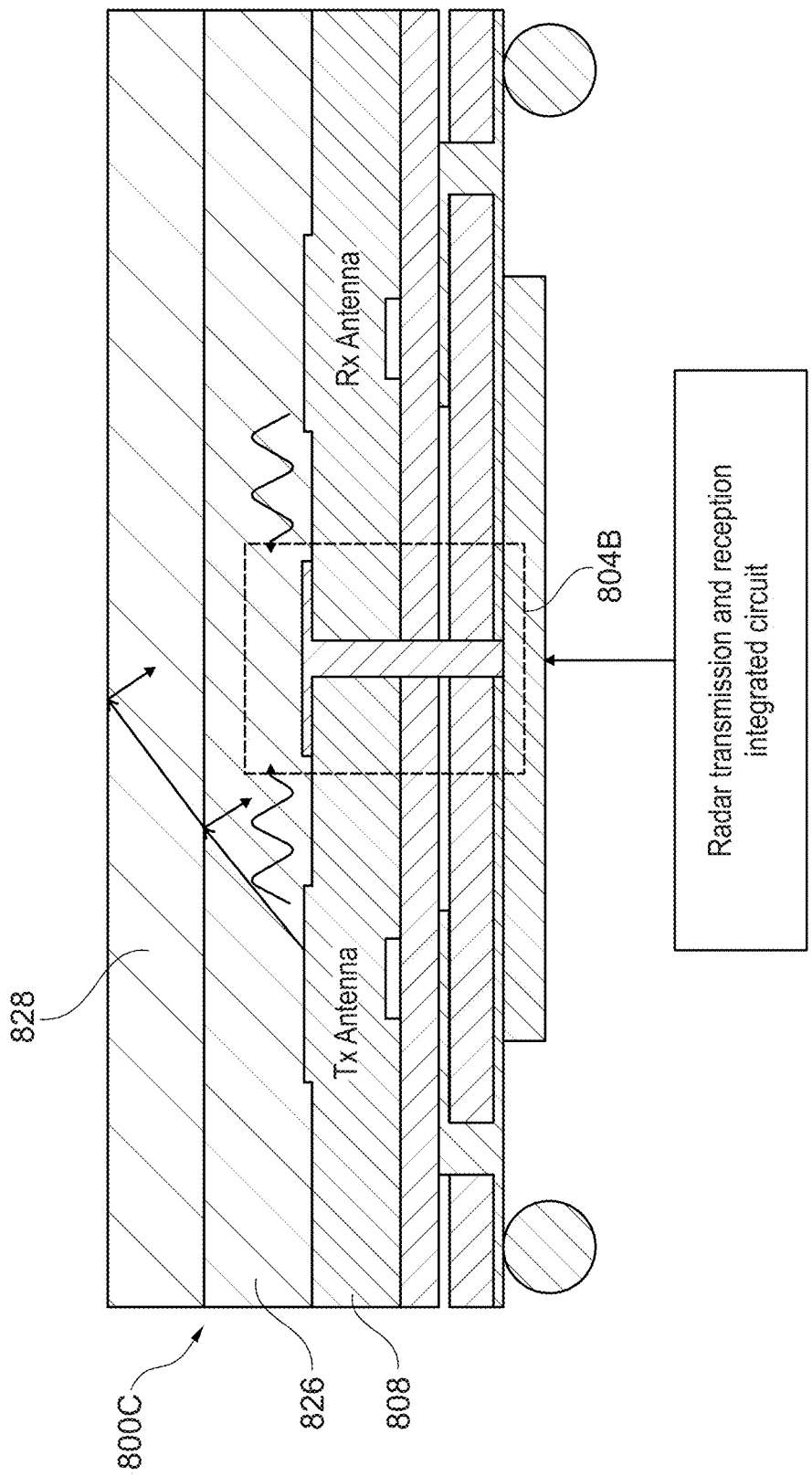

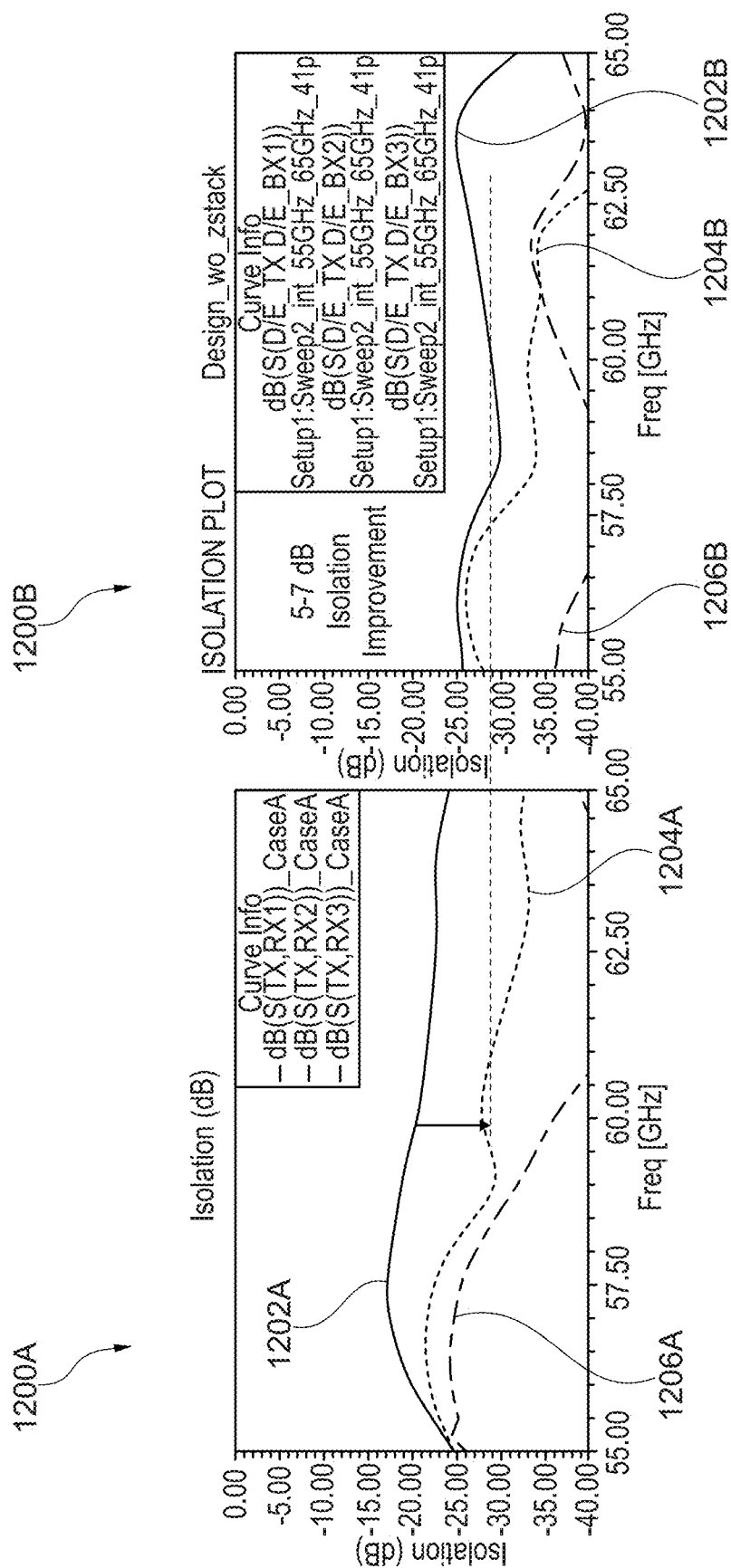

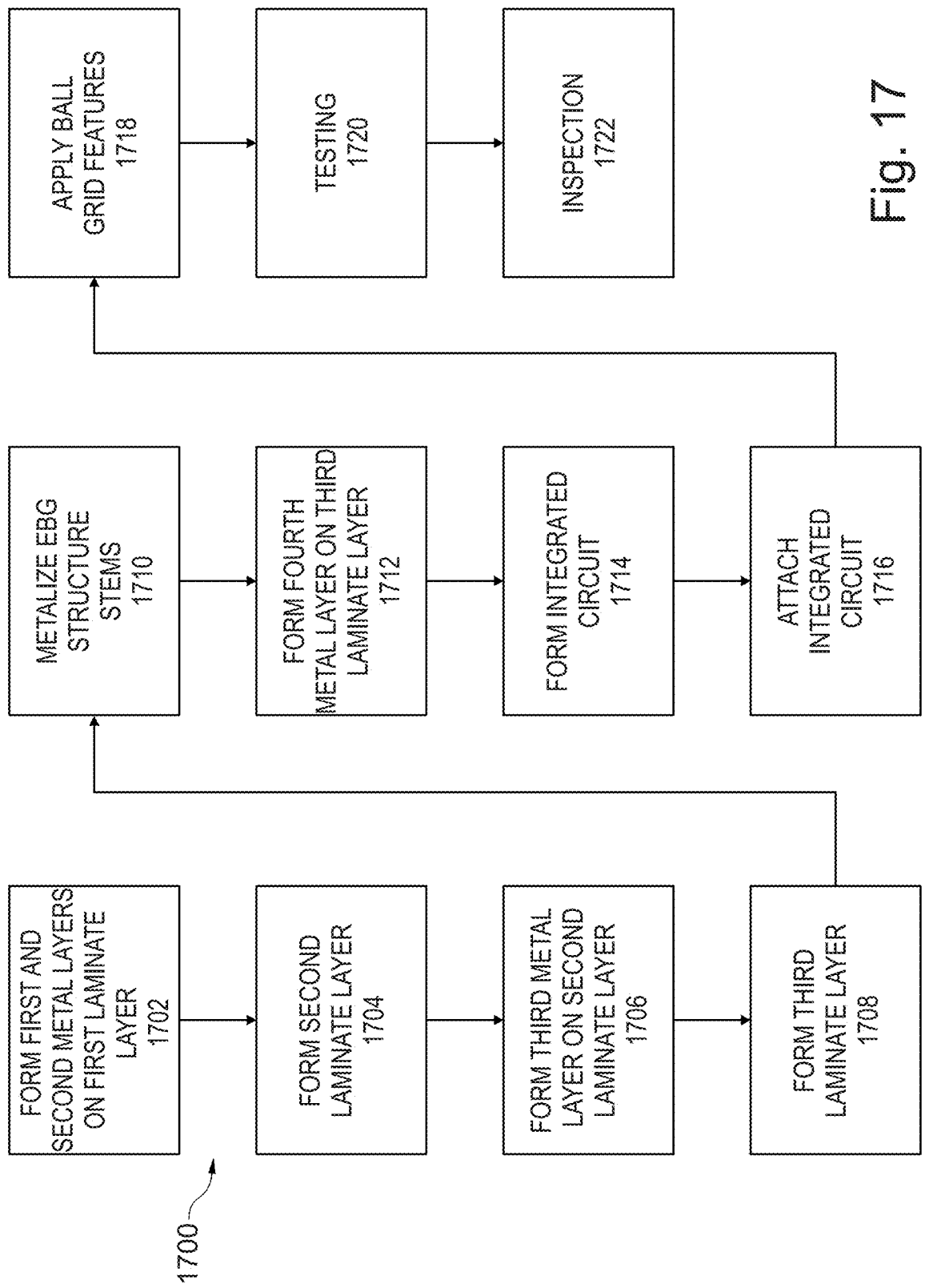

INTEGRATION OF EBG STRUCTURES (SINGLE LAYER/MULTI-LAYER) FOR ISOLATION ENHANCEMENT IN MULTILAYER EMBEDDED PACKAGING TECHNOLOGY AT MMWAVE

TECHNICAL FIELD

The present invention relates generally to a radio frequency electronic device, and, in particular embodiments, to radio frequency electronic device packages and the methods of formation thereof.

BACKGROUND

Packaged radio frequency devices utilizing multiple antenna elements such as radar sensors may be configured in portable devices as, for example, an interface to control functionality of the device. Many portable devices are necessarily small so embedded radar systems with reduced form factors are desirable. Antenna elements embedded in a package of a radio frequency ("RF") radar system account for a large percentage of the total package size. As a result, antenna location and minimization of the corresponding radio frequency device layout size may be a priority during package design of integrated RF multi-antenna systems.

SUMMARY

In accordance with embodiments, a packaged radar comprises a plurality of laminate layers; a ground plane associated with at least one of the laminate layers; a transmit antenna and a receive antenna associated with at least one of the laminate layers; and an electromagnetic band gap structure arranged between the transmit antenna and the receive antenna for isolating the transmit antenna and the receive antenna, the electromagnetic band gap structure comprising a plurality of elementary cells forming a plurality of adjacent columns each coupled to the ground plane, and each elementary cell comprising a conductive planar element and a columnar element coupled to the conductive planar element.

BRIEF DESCRIPTION OF THE DRAWINGS

For a more complete understanding of the present invention, and the advantages thereof, reference is now made to the following descriptions taken in conjunction with the accompanying drawings, in which:

FIG. 8A is a cross-sectional view of a packaged radar system having isolated transmit and receive antennas at a first depth using an EBG structure according to a first embodiment;

FIG. 9A is a cross-sectional view of a packaged radar system having isolated transmit and receive antennas at a first depth using an EBG structure according to a second embodiment;

FIG. 9B is a cross-sectional view of a packaged radar system having isolated transmit and receive antennas at a second depth using an EBG structure according to the second embodiment;

FIG. 10 is a cross-sectional view of a packaged radar system having isolated transmit and receive antennas using an EBG structure according to a third embodiment;

FIG. 12A is an isolation plot associated with the packaged radar system of FIG. 11A;

FIG. 12B is an isolation plot associated with the packaged radar system of FIG. 11B;

FIG. 17 is a flow chart of a method of forming a packaged radar system having isolated transmit and receive antennas using at least one EBG structure according to an embodiment.

DETAILED DESCRIPTION OF ILLUSTRATIVE EMBODIMENTS

Electromagnetic Band Gap ("EBG") structures are a category of 2D and 3D resonating defects etched in the ground plane of an RF circuit in to reduce the size of a passive component (e.g. antenna or filter) and/or reduce the mutual coupling in array configurations.

In many radar applications, including packaged radar applications, the transmit antenna is in close proximity to one or more receive antennas. The transmit antenna and the receive antennas can share the same ground plane, which leads to a strong coupling at least between the transmit antenna and the closest receive antenna.

According to embodiments, the coupling between the transmit antenna and the receive antennas is reduced by inserting a wall comprising a plurality of elementary artificial magnetic conductors ("AMC" cells, or cells) therebetween. These cells act like a perfect magnetic conductor where the phase of the reflection coefficient ranges from −90° to +90°. In this way, they present a high impedance boundary without affecting (cancelling out) the electric field distribution of the co-existing antennas.

Figure 1A:
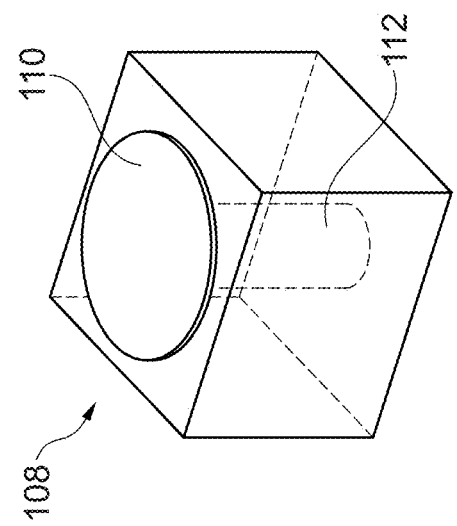
FIG. 1A is a three-quarters view of an Electromagnetic Band Gap ("EBG") structure having a single rectangular patch.

FIG. 1A is a three-quarters view of a portion of an EBG structure 102, this portion taking the form of an elementary AMC cell having a planar element 104 and a corresponding columnar element, or stem, 106 fastened thereto. In a packaged application, the planar element 104 and the stem 106 are typically coupled to a ground plane. They may be directly coupled to the ground plane, or coupled to it indirectly, such as via one or more other cell with which the considered cell is vertically stacked.

The planar element, or patch, may have any shape, such as an elliptical, circular, or polygonal shape, for example a rectangular shape as illustrated in FIG. 1A.

Figure 1B:
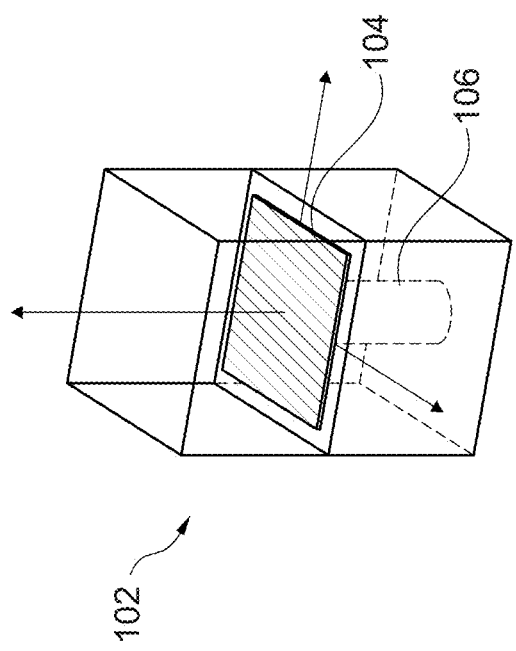
FIG. 1B is a three-quarters view of an EBG structure having a single circular patch.

FIG. 1B is a three-quarters view of an AMC cell having a circular patch 110 and a corresponding stem 112.

Figure 1C:
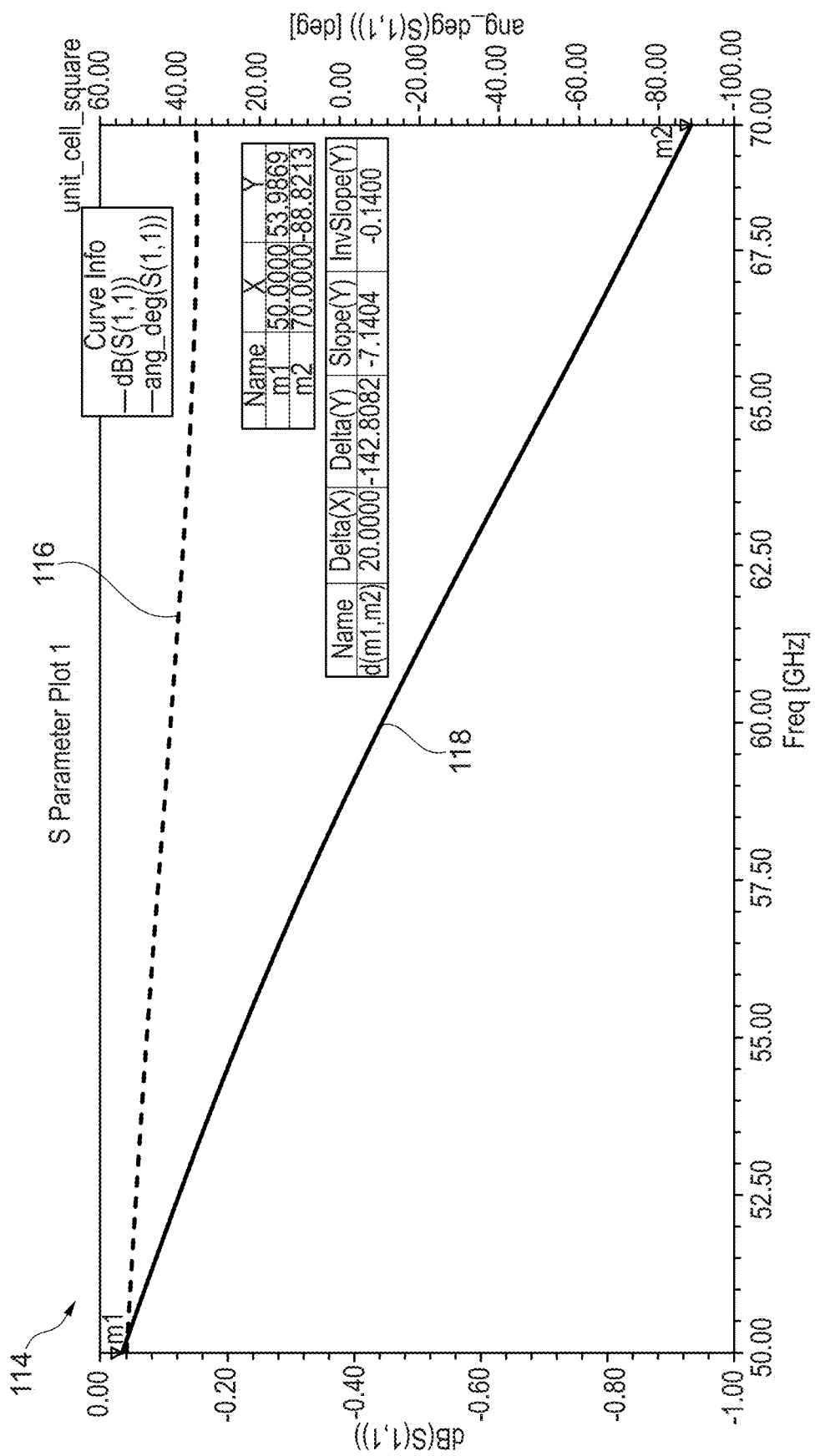
FIG. 1C is an S-parameter plot associated with the EBG structure of FIG. 1A.

FIG. 1C is an S-parameter plot associated with the EBG structure 102 of FIG. 1A. The return loss of an AMC cell is close to 0 dB (total reflection as is shown in curve 116) yet the phase of the reflection is not 180° typical of a metallic surface. In contrast, the reflection phase 118 ranges from 53° at 50 GHz to −88° at 70 GHz. This means that over the bandwidth of interest (for example 60 GHz) the AMC cells behave like an artificial magnetic conductor.

Figure 1D:
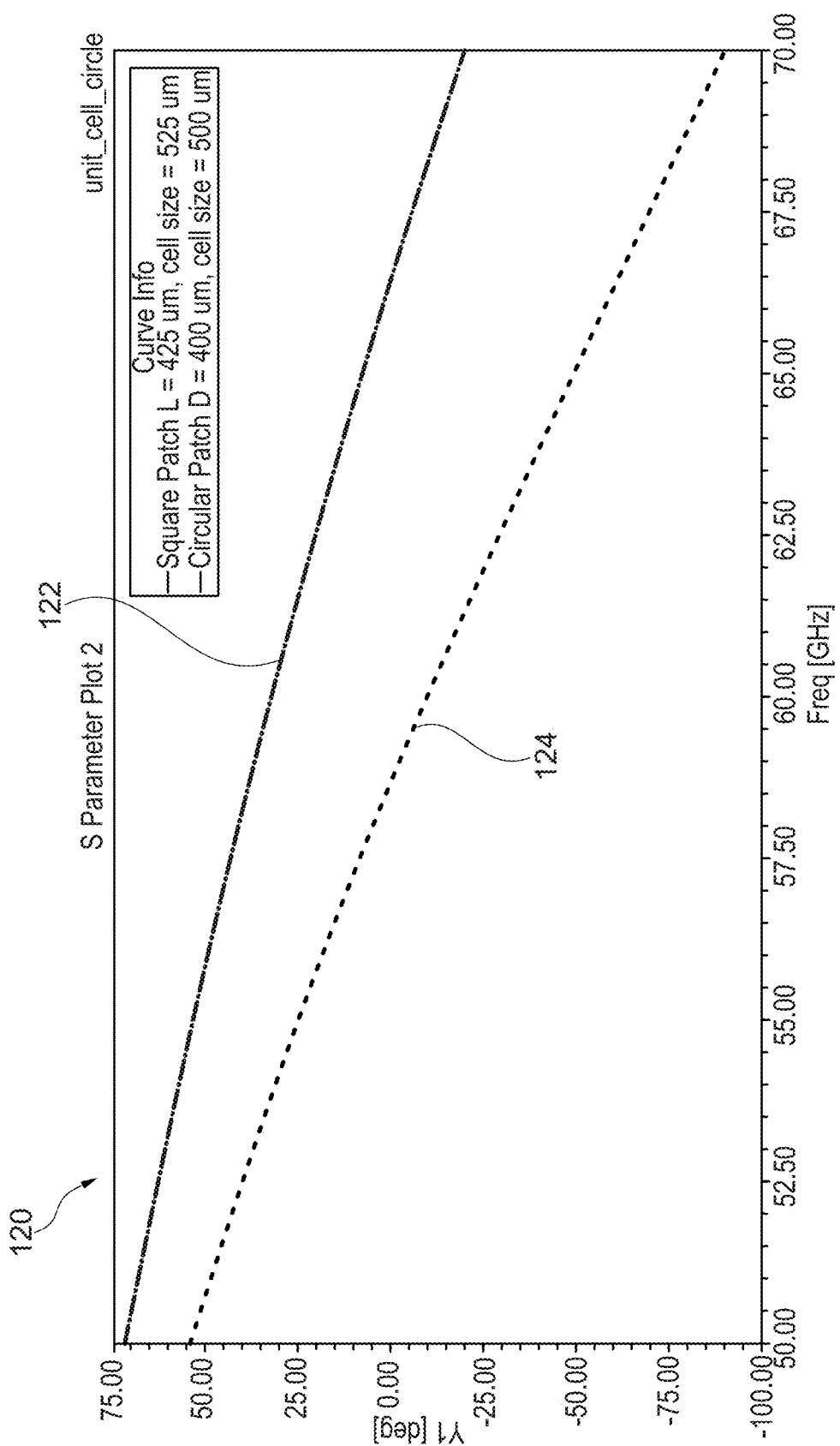
FIG. 1D is an S-parameter phase plot associated with the EBG structures of FIGS. 1A and 1B.
Figure 2:
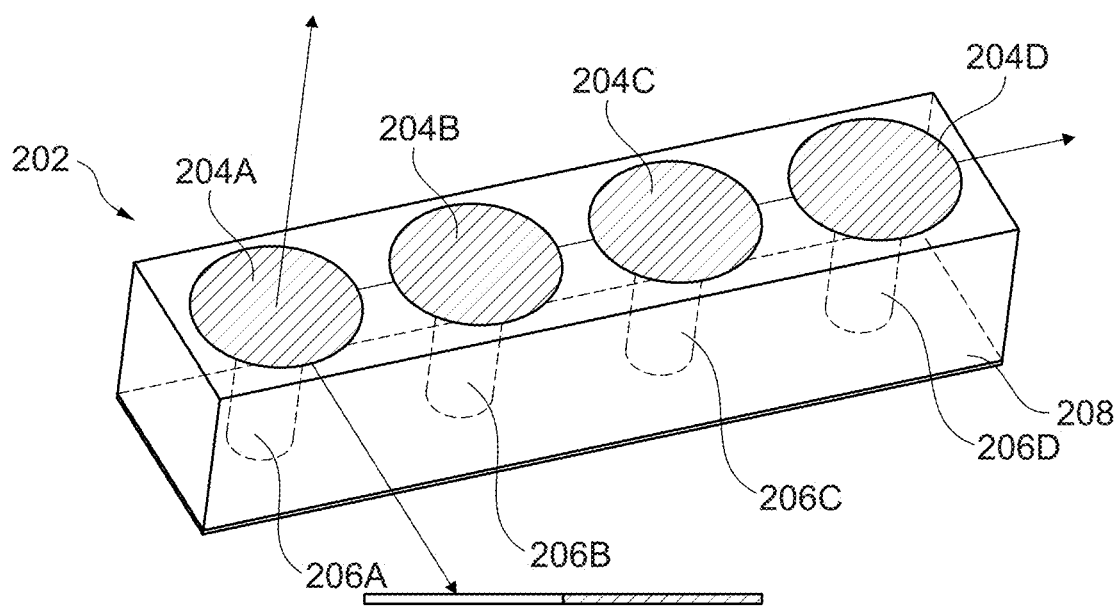
FIG. 2 is a three-quarters view of a row of circular EBG structures.

FIG. 1D is an S-parameter phase plot associated with the EBG structures of FIGS. 1 and 2. As expected, any shape of the patch can support an AMC behavior. For example curve 122 represents the reflection phase of a circular EBG structure having a patch diameter of 400 μm and a cell size of 500 μm. Curve 124 shows the similar reflection phase of the square EBG structure having a patch length of 400 μm and a cell size of 525 μm.

FIG. 2 is a three-quarters view of a row 202 of elementary cells each having a circular patch 204A, 204B, 204C, and 204D, as well as corresponding stems 206A, 206B, 206C, and 206D extending from the circular patches down to a ground plane 208.

Figure 3:
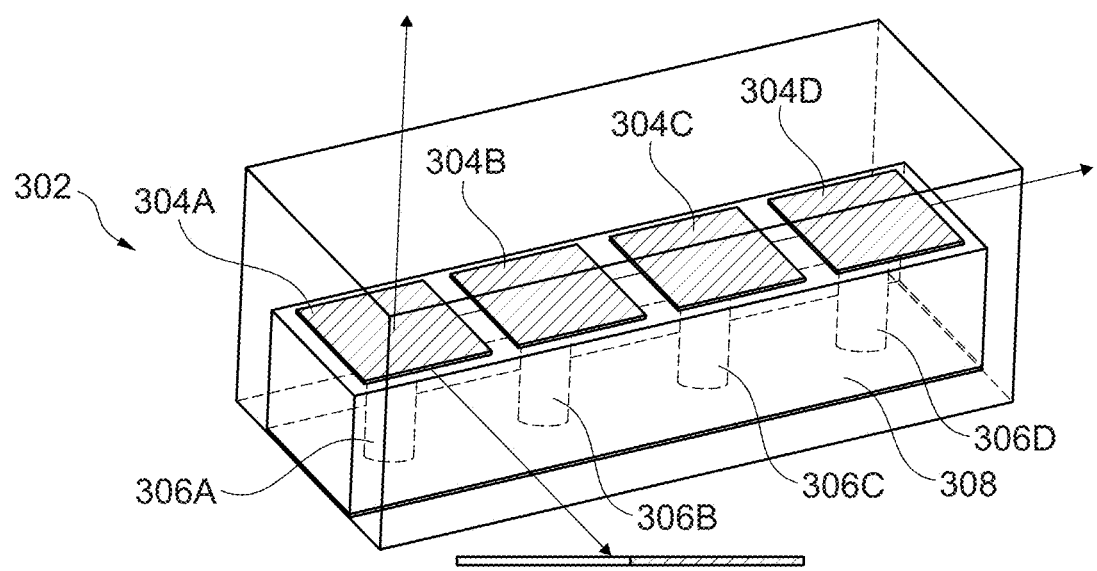
FIG. 3 is a three-quarters view of a row of rectangular EBG structures.

FIG. 3 is a three-quarters view of a row 302 of cells, showing individual rectangular patches 304A, 304B, 304C, and 304D, as well as corresponding stems 306A, 306B, 306C, and 306D extending from the rectangular patches down to a ground plane 308.

Figure 4:
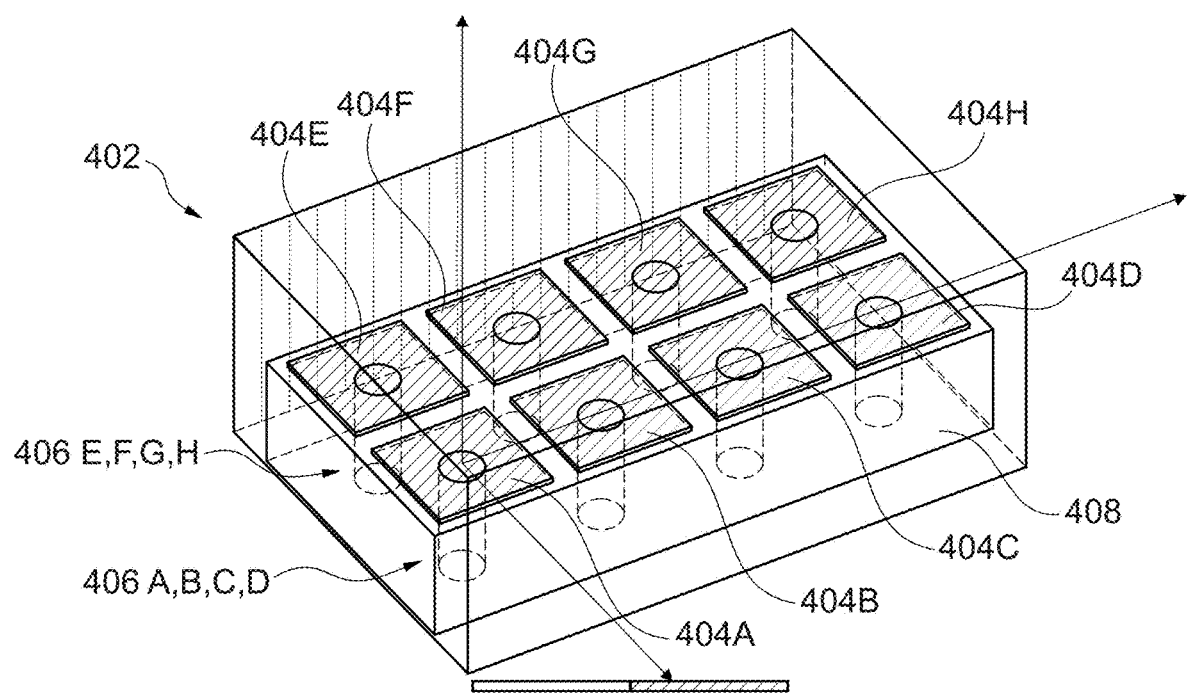
FIG. 4 is a three-quarters view of two rows of rectangular EBG structures.

FIG. 4 is a three-quarters view of an array of cells having two rows 402, showing a first row of individual rectangular patches 404A, 404B, 404C, and 404D, and a second row of individual rectangular patches 404E, 404F, 404G, and 404H, as well as corresponding stems arranged in a first row of stems 406A, 406B, 406C, and 406D, and corresponding stems arranged in a second row of stems 406E, 406F, 406G, and 406H. The stems extend from the rectangular patches down to a ground plane 408.

Figure 5:
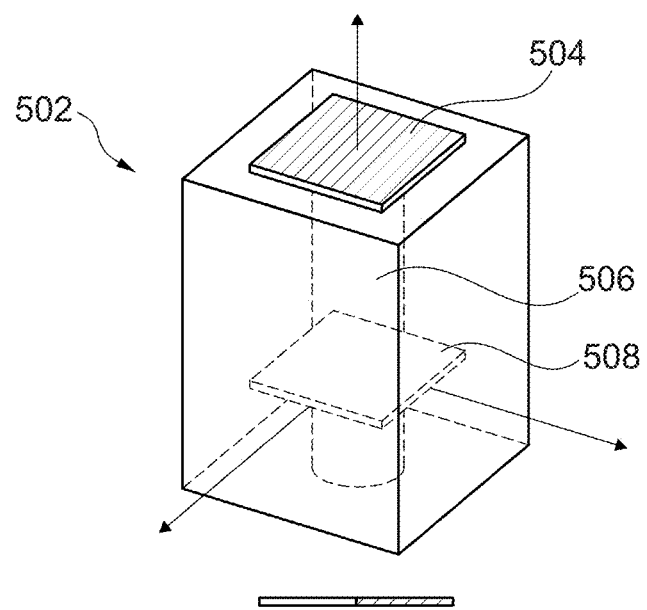
FIG. 5 is a three-quarters view of a rectangular EBG structures having patches on two metal layer locations according to an embodiment.

FIG. 5 is a three-quarters view of a portion of an EBG structure 502 taking the form of a column made up by two elementary cells stacked on top of one another. Each cell has a rectangular patch, the two patches being located at different respective locations along the main direction of the column. The patch of the bottom cell is electrically coupled to the stem of the top cell. For instance, they are fastened to one another. The patches of the cells may have identical or different dimensions, and/or same or identical shapes. Although FIG. 5 shows a column comprising two cells, a given column may be formed by any number of superposed cells, or even by a single cell, which itself exhibits a columnar configuration as illustrated in FIG. 1A.

The smaller cell size of the EBG structure is desirable for isolating the transmit antenna and one or more received antennas in packaged radar applications as was previously discussed. In an example, for the same AMC behavior the cell size of EBG structure 102 may have a length of 525 μm on a side and the cell size of EBG structure 502 may have a length of only 400 μm on a side.

In an example application of a packaged radar having four conductive layers and three laminate layers, the composition of the columns of EBG structures 102 and 502 are contrasted below. The square patch on the fourth conductive layer for EBG structure 102 is 425 μm by 425, whereas the square patch 504 on the fourth conductive layer for EBG structure 502 can be reduced to 250 μm by 250 μm. The columns of EBG structure 102 can include a single cell and be terminated at the third conductive layer, which is coupled to ground, whereas the columns of EBG structure 502 may include several cells, including a cell having a patch 508 at the third conductive layer having a size of 250 μm by 250 μm. For EBG structure 102, the columns may not reach the first and second conductive layers, since the top cell terminates at the third conductive layer. For EBG structure 502, the second conductive layer is not used, but the columns terminate at a first conductive layer, which is coupled to ground. Further explanation and description of a packaged radar device having multiple conductive and laminate layers is given below with respect to FIGS. 8A, 8B, 9A, 9B, and 10.

Figure 6:
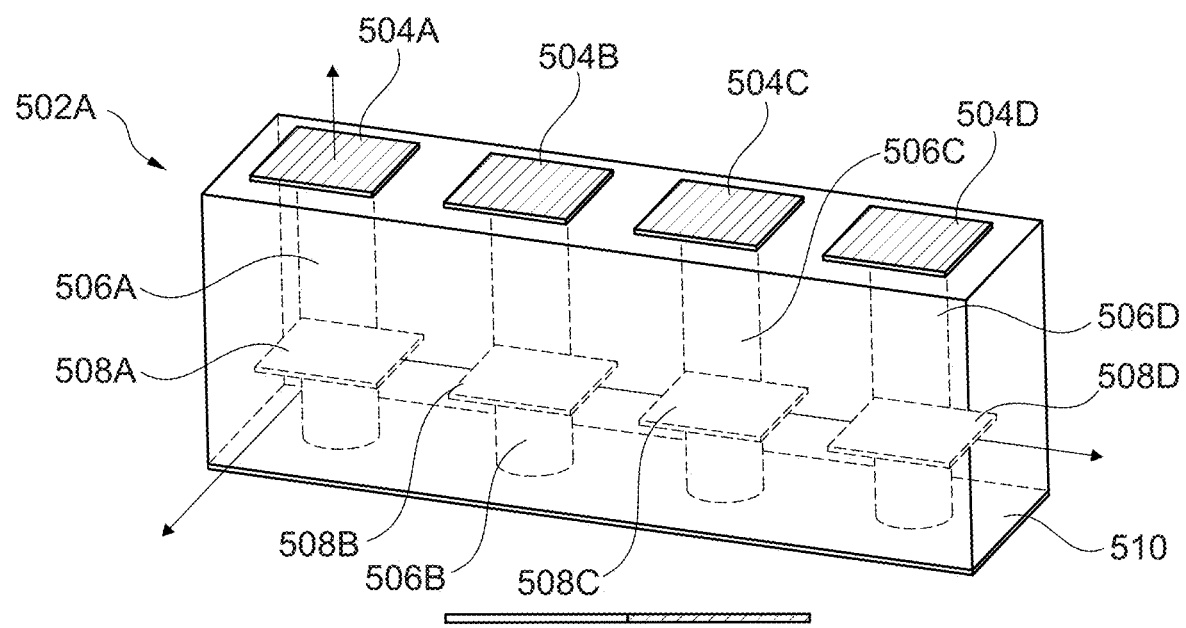
FIG. 6 is a three-quarters view of a row of rectangular EBG structures having patches on two metal layer locations according to an embodiment.

FIG. 6 is a three-quarters view of a row 502A of columns each having two cells on top of each other. The individual columns are substantially as described above with respect to FIG. 5. Thus a first column comprises a first patch 504A a stem 506A coupled to the patch 504A, and a second patch 508A wherein the corresponding stem of patch 508A terminates in ground plane 510. A second column comprises a first patch 504B, a corresponding stem 506B, and a second patch 508B of a second cell, wherein the corresponding stem of the second patch 508B terminates in ground plane 510. A third column comprises a first patch 504C, a corresponding stem 506C, and a second patch 508C, wherein the corresponding stem of the second patch 508C terminates in ground plane 510. A fourth column comprises a first patch, an associated stem 506D, a second patch, and a corresponding stem that terminates in ground plane 510 associated. As illustrated in FIG. 6, two different stems within a given column may have different lengths. The patches 504A, 504B, 504C, 504D may be located at a same height and may be associated with a given conductive layer, e.g. a fourth conductive layer, for instance are located at the height thereof. The patches 506A, 506B, 506C, 506D may be located at a same height and may be associated with another given conductive layer, e.g. a third conductive layer, for instance are located at the height thereof. The ground plane 510 may be associated (e.g. may be located at the height thereof) with a corresponding conductive layer (e.g. a first conductive layer).

Figure 7:
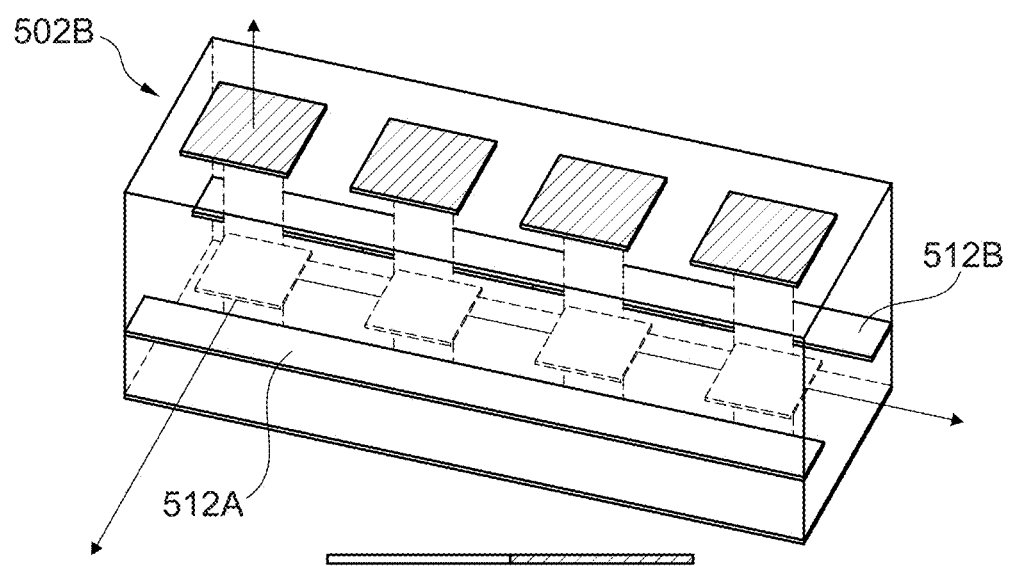
FIG. 7 is a three-quarters view of a row of rectangular EBG structures having patches on two metal layer locations and an associated metal ground plane feature according to an embodiment.

FIG. 7 is a three-quarters view of a row 502B of columns having cells whose patches are on two metal layer locations and an associated conductive layer features 512A and 512B according to an embodiment. The individual columns are substantially as described above with respect to FIG. 5. The features 512A and 512B corresponding to opposing edges of a slot that has been arranged in a conductive layer to receive the columns therethrough. The columns for instance comprise patches which are located at the same height as the conductive layer. Features 512A and 512B can be used, for example, to further enhance the AMC behavior of the row 502B of rectangular EBG structures if desired for a particular application. The conductive layer comprising features 512A and 512B may comprise a ground plane.

The EBG structures shown in FIGS. 5-7 can be modified as desired. For example, while square patches are shown other patches such as circular or bell-shaped patches can be used. In general, any polygonal shape may be used. While only one additional square patch is shown associated with a third conductive layer, additional square patches or additional circular patches can be used associated with any conductive layer. While an EBG structure having only a single row of columns is shown, multiple rows of columns can be used. While a ground plane on a first conductive layer is shown, other levels of conductive layers can be used to couple the stem of the AMC cells to ground. The stem of the AMC cells can be isolated from or coupled to any of the conductive layers in the packaged radar as is required for a given application.

FIG. 8A is a cross-sectional view of a packaged radar system 800A having isolated transmit 802 and receive 806 antennas using an EBG structure having adjacent columns arranged between the respective regions of transmit 802 and receive 806 antennas, of which column 804A is visible. The packaged radar system 800A includes a plurality of stacked laminate layers 808, 810, and 812, and a plurality of conductive layers including a first conductive layer 820 that may be used as a ground plane, a second conductive layer 818, a third conductive layer 816, and a fourth conductive layer that may be used to form the transmit 802 and receive 806 antennas, and optionally the topmost patch of the column 804A. The conductive layers may include patterned metal layers that are selectively either electrically connected to or isolated from the stem of the EBG structure. The conductive layers may themselves be interconnected with vias such as via 822A, which interconnects portions of the fourth and third conductive layers, and via 822B, which also interconnects portions of the fourth and third conductive layers. Packaged radar system 800A also includes a radar transmission and reception integrated circuit 824 that is affixed to the bottom surface of the first laminate layer 812 and first conductive layer 820. Integrated circuit 824 may be electrically connected to various conductive layers of the packaged radar system 800A through additional vias through conductive layer 820 (not shown in FIG. 8A). A ball grid array including solder balls 814A and 814B may also be affixed to the bottom surface of the first laminate layer 812 and first conductive layer 820 so that the radar system can be used together with other components in a larger system including, for example, other components such as memory or processing components.

The column 804A itself includes a single cell whose patch is located at the same depth as the transmit and receive antenna, i.e. in this embodiment, the top surface of the top layer 808. The stem of the cell is connected to the ground plane 820. In a general sense, the planar elements of the EBG structure may be located at any depth within the packaged radar, although in a preferred configuration, the topmost patches of the EBG structure are located at a depth which is inferior or equal (e.g. at a greater height) to that of the transmit and receive antennas. In other words, the topmost patches of the EBG structure (i.e. those the closest to the top surface of the packaged radar) are at a same height as the transmit and receive antennas, or at a higher location. In addition, although the antennas have been illustrated as being located on the top surface of the package, in other embodiments, the antennas may be located within the package itself.

Figure 8B:
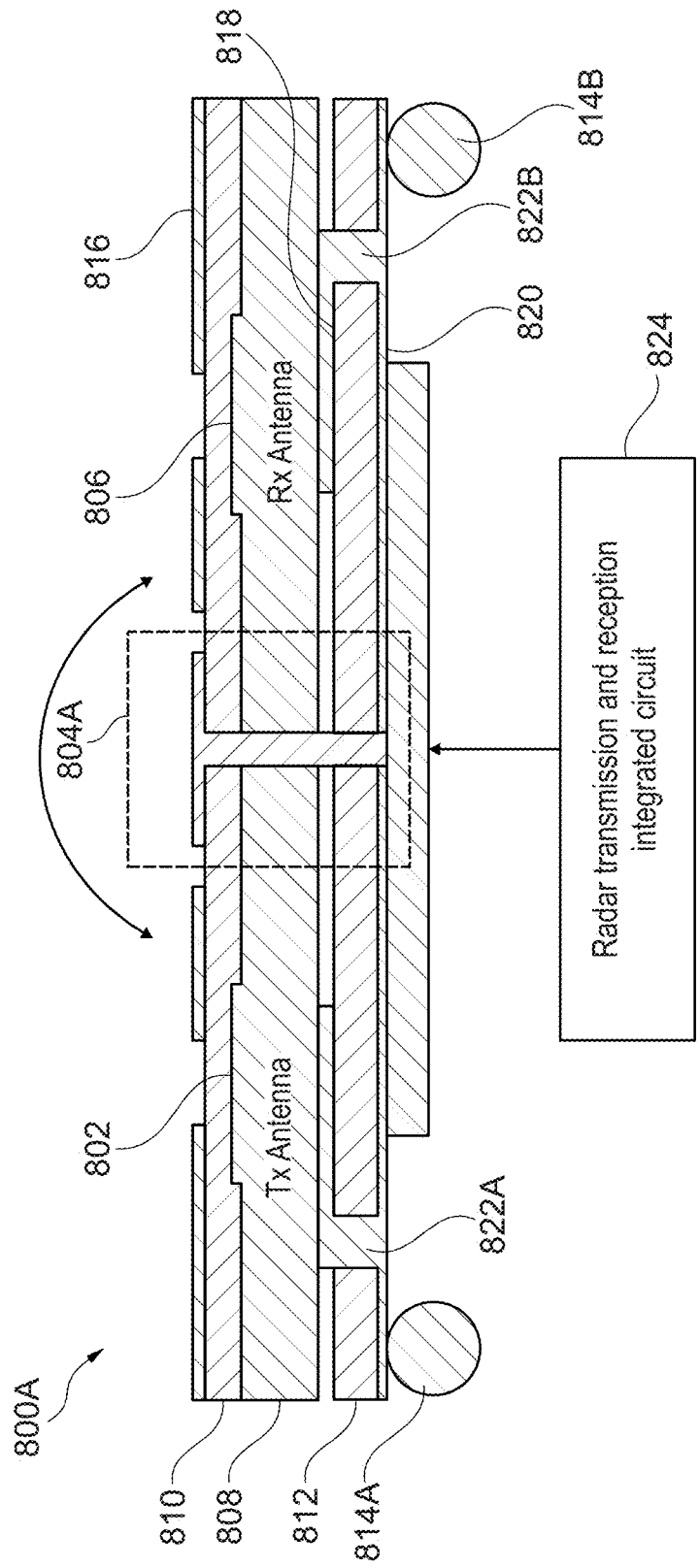
FIG. 8B is a cross-sectional view of a packaged radar system having isolated transmit and receive antennas at a second depth using an EBG structure according to the first embodiment.

In FIG. 8A, the transmit antenna 802 and the receive antenna 806 are associated with an upper laminate layer 808. However, laminate layer 808 and transmit 802 and receive 806 antennas can be placed in an intermediate position within the packaged radar system 800A, or even in a bottom position with respect to a main upper surface thereof. Laminate layer 808 is shown in an intermediate layer position in FIG. 8B. In this FIG. 8B, the transmit 802 and receive 806 antenna are located at a lower height within the packaged radar system 800A than the planar patch of cell 804A. In FIG. 8B, laminate layer 810 has been correspondingly moved to the upper layer position.

While the column of the EBG structure shown in FIGS. 8A and 8B can include a single AMC cell as shown that effectively isolates the transmit antenna 802 from the receive antenna 806, the size of the patch for effective isolation may not be optimum for use in a compact packaged radar system. Thus, a more compact packaged radar system is shown in FIG. 9A and described below using an EBG structure having smaller sized patches associated with multiple conductive layers.

FIG. 9A is a cross-sectional view of a packaged radar system 800B having isolated transmit 802 and receive 806 antennas using an EBG structure 804B according to a second embodiment. Only the column of the EBG structure is changed in FIG. 9A, and thus not all of the numerals used to identify the laminate and conductive layers and other features of the packaged radar system 800B are replicated for convenience. In FIG. 9A, the column 804B of the EBG structure includes a plurality of stacked cells. For instance, a first top patch of the column is associated with the fourth conductive layer, and a second patch of the column is associated with the third conductive layer. For instance, the size of the patches in the column 804B of FIG. 9A are all smaller than the single patch in the column 804A of FIGS. 8A and 8B, previously described, but without any loss of isolation performance. That is, the transmit 802 and receive 806 antennas are isolated from each to the same level of performance in both radar systems 800A and 800B, although the footprint of radar system 800B can be smaller than that of radar system 800A.

In FIG. 9A, the transmit antenna 802 and the receive antenna 806 are associated with an upper laminate layer 808. However, laminate layer 808 and transmit 802 and receive 806 antennas can be also be placed in an intermediate position within the packaged radar system 800A, or even in a bottom position with respect to a main upper surface thereof. Laminate layer 808 is shown in an intermediate layer position in FIG. 9B. In this FIG. 9B, the transmit 802 and receive 806 antenna are at a lower location within the packaged radar system 800A than the uppermost planar patch of cell 804B. In FIG. 9B, laminate layer 810 has been correspondingly moved to the upper layer position.

While the packaged radar systems shown in FIGS. 8A, 8B, 9A and 9B are sufficient for many applications, other laminate layers or layers external to the packaged radar system can also be used. These layers can generate internal reflections that add to the coupling between the transmit and receive antennas. Such a packaged radar system is shown in FIG. 10 and described below.

FIG. 10 is a cross-sectional view of a packaged radar system 800C having isolated transmit 802 and receive 806 antennas using an EBG structure according to a third embodiment. Not all of the numerals used to identify the laminate and conductive layers and other features of the packaged radar system 800C are replicated from the embodiments previously described in FIGS. 8A, 8B, 9A and 9B for convenience. Packaged radar system 800C includes an additional layer 826 that may comprise an additional laminate layer on top of the fourth conductive layer that may or may not include an additional conductive layer, or may comprise a layer external to the packaged radar system, or may comprise an air pocket layer underneath layer 828. Packaged radar system 800C also includes an additional layer 828 that may comprise a glass, Acrylonitrile Butadiene Styrene ("ABS"), or other plastic layer. While these layers may be useful in many applications (for example, layers 826 and 828 may comprise a radome) they can cause reflections from the transmit antenna 802 to the receive 806. For example, reflections may occur at the interface 830 between layer 826 and layer 828, and at the surface 832 of the layer 828. A single AMC cell 804C is shown in FIG. 10, which may be the same as that shown in either FIGS. 8A, 8B, 9A or 9B, previously described. The placement of the transmit and receive antennas and corresponding laminate layer shown in FIG. 10 may be associated with an uppermost laminate layer position, an intermediate laminate layer position, or a bottommost laminate layer position.

Figure 11A:
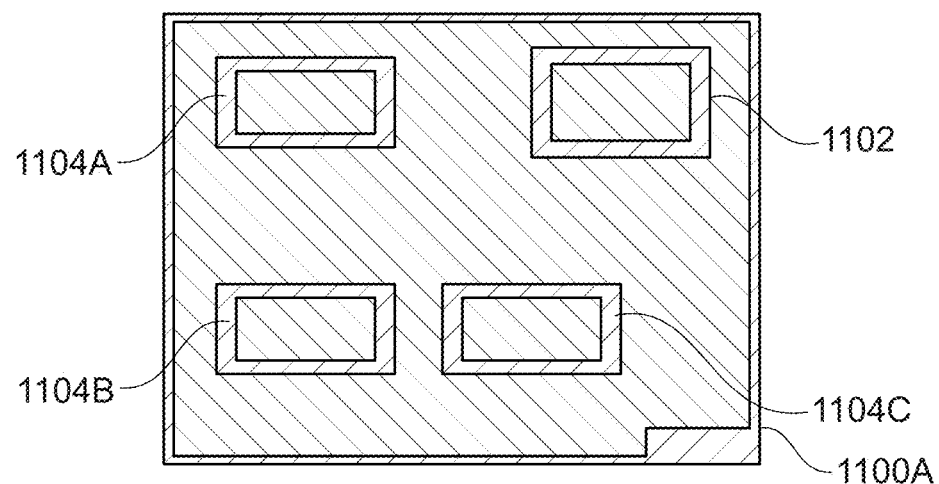
FIG. 11A is a plan view of a packaged radar system having one transmit antenna and three receive antennas.

FIG. 11A is a plan view of a packaged radar system 1100A having one transmit antenna 1102 and three receive antennas 1104A, 1104B, and 1104C. Packaged radar system 1100A may have coupling between the transmit antenna 1102 and one or more of the receive antennas 1104A, 1104B, and 1104C. In the plan view shown in FIG. 11A each of the transmit and receive antennas are a portion of, for example, the fourth conductive layer surrounded by an etched ring wherein the conductive material is removed.

Figure 11B:
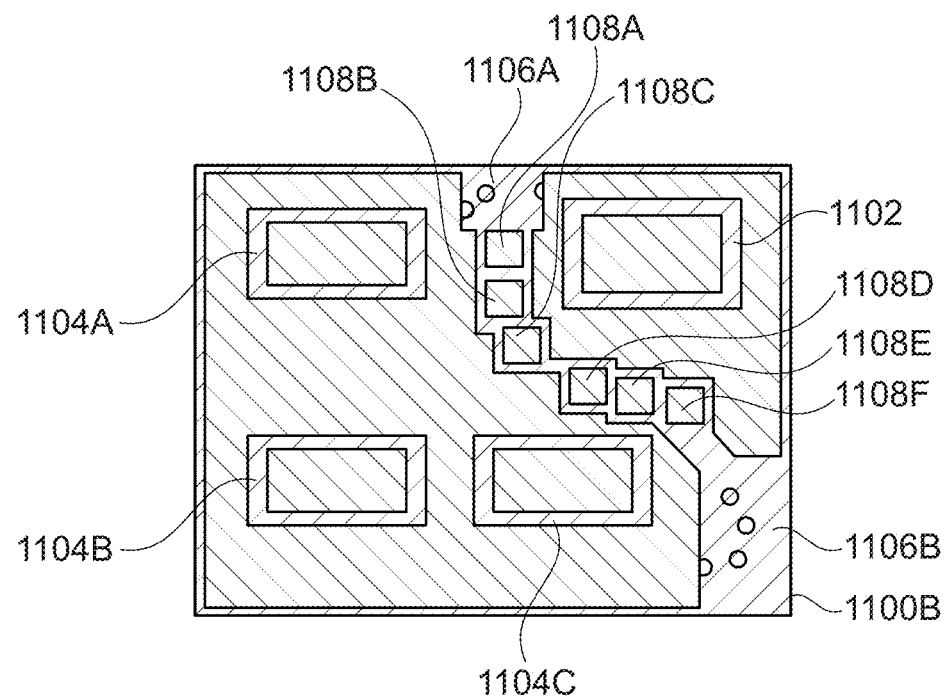
FIG. 11B is a plan view of a packaged radar system having one transmit antenna isolated from three receive antennas using a plurality of EBG structures according to an embodiment.

FIG. 11B is a plan view of a packaged radar system 1100B having one transmit antenna 1102 isolated from three receive antennas 1104A, 1104B, and 1104C using an EBG structure having a plurality of columns 1108A, 1108B, 1108C, 1108D, 1108E, and 1108F according to an embodiment. The columns are arranged in a row which forms a vertical structure, or "wall", placed between the transmit antenna 1102 and the receive antennas. Within this row, the patches of neighboring columns which are a same height are laterally capacitively coupled together. Due to the EBG structure, packaged radar system 1100B has effective isolation between the transmit antenna 1102 and one or more of the receive antennas 1104A, 1104B, and 1104C without significantly increasing the footprint of the packaged radar system due to the compact nature of the EBG structure used. In the plan view shown in FIG. 11B each of the transmit and receive antennas are a portion of, for example, the fourth conductive layer surrounded by an etched ring wherein the conductive material is removed. In a plan view, the topmost patches of the columns 1108A, 1108B, 1108C, 1108D, 1108E, and 1108F are visible. The row they form may stretch between the edges of the package, or alternatively as shown to etched areas 1106A and 1106B wherein the conductive material in the fourth conductive layer is removed, and which are themselves located on edges of the package. The columns can include one cell or multiple cells having patches on multiple conductive layers so that isolation is maximized without significantly increasing the area of the corresponding EBG structure. As illustrated, the EBG structure is thus arranged between the transmit antenna and the receive antennas to isolate them. The columns can be arranged in an array having one or more rows of columns, the array being laid out to follow a path so as to form a wall that best conforms to the layout of the radar system. The layout of the array may follow a rectilinear trajectory. Alternatively, it may follow a non-rectilinear trajectory, as shown in FIG. 11B. While a single wall, i.e. an array having a single row of adjacent columns, is shown FIG. 11B, a dual or triple wall of columns can also be used, i.e. an array having multiple rows of columns extending within the packaged radar may be used. Advantageously, these walls, or rows, are substantially parallel to one another. Multiple walls can also be used in the case where more than one transmit antenna or transmit antenna zone must be isolated from more than one receive antenna or receive antenna zone. Although square patches are visible in the plan view of FIG. 11B it will be apparent to those skilled in the art that circular or other shaped patches can also be used to form the isolation wall that is the EBG structure.

FIG. 12A is an isolation plot associated with the packaged radar system of FIG. 11A. Traces 1202A, 1204A, and 1206A show the coupling between the transmit antenna and the first, second, and third receive antennas.

FIG. 12B is an isolation plot associated with the packaged radar system of FIG. 11B. Traces 1202B, 1204B, and 1206B show the coupling between the transmit antenna and the first, second, and third receive antennas after the inclusion of an isolation wall comprising a plurality of irregularly arranged columns according to an embodiment. Note that a 5 to 7 dB improvement in isolation is realized between the transmit antenna and the receive antennas at a frequency of interest (60 GHz) without a significant increase in the footprint of the packaged radar system.

FIGS. 13-16 are plan views of packaged radar systems including various isolated antenna configurations according to embodiments.

Figure 13:
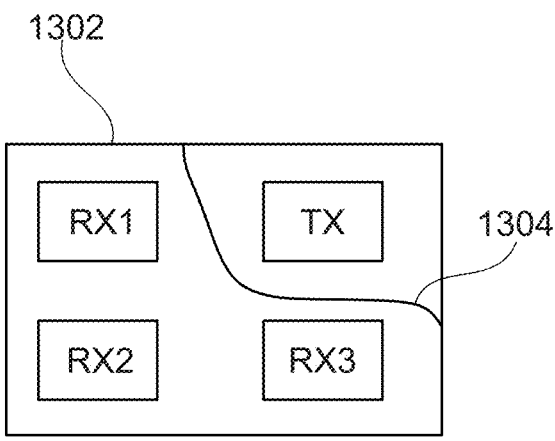
FIGS. 13-16 are plan views of packaged radar systems including various isolated antenna configurations according to embodiments.

For example, FIG. 13 is a plan view of a packaged radar system 1302 substantially as described with respect to FIG. 11B having a single transmit antenna TX, three receive antennas RX1, RX2, and RX3 and a non-rectilinear EBG structure 1304 including columns arranged in one or more rows.

Figure 14:
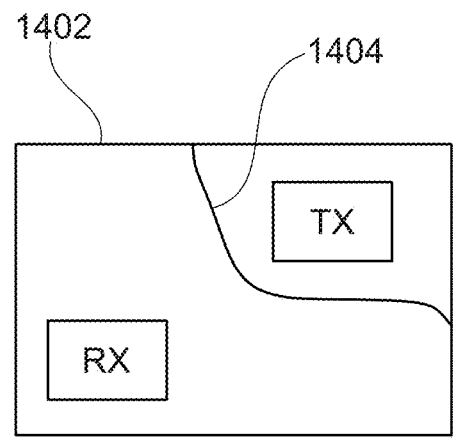
Figure 15:
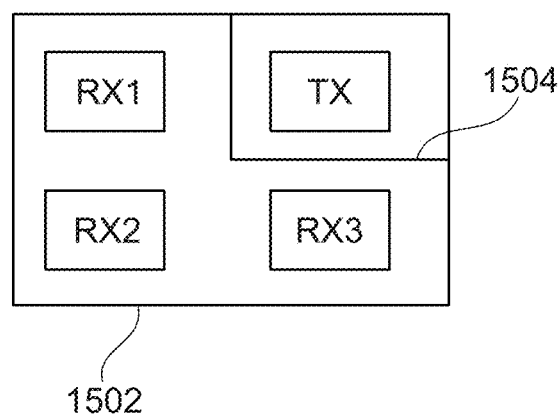
Figure 16:
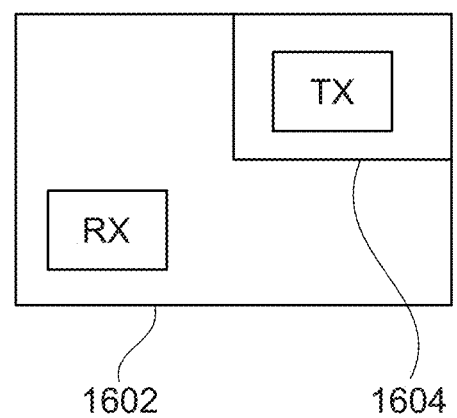

FIG. 14 is a plan view of a packaged radar system 1402 having a single transmit antenna TX, a single receive antennas RX and a non-rectilinear EBG structure 1404 including columns arranged in one or more rows. FIG. 15 is a plan view of a packaged radar system 1502 substantially as described with respect to FIG. 11B having a single transmit antenna TX, three receive antennas RX1, RX2, and RX3 and a EBG structure 1504 including columns arranged in one or more rows and following a trajectory having two rectilinear portions arranged orthogonally one relative to the other. FIG. 16 is a plan view of a packaged radar system 1602 having a single transmit antenna TX, a single receive antenna RX a EBG structure 1604 including columns arranged in one or more rows and following a trajectory having two rectilinear portions arranged orthogonally one relative to the other.

While various isolation walls are shown in FIGS. 11B and 13-16 for various packaged radar systems, it will be appreciated by those skilled in the art that various other types and shapes of isolation walls and antennas configurations including multiple transmit, receive, and transceiver zones could benefit from the isolation provided by the compact EBG structures described herein.

FIG. 17 is a flow chart 1700 of a method of forming a packaged radar system having isolated transmit and receive antennas using at least one EBG structure according to an embodiment. Other methods other than the one described below can also be used.

At step 1702 the first and second conductive layers 818 and 820 can be formed on the first laminate layer 812, such as any patches associated with an AMC cell. For instance, this step can be carried out using an etching process.

At step 1704 the second laminate layer 810 can be formed on the first laminate layer 812.

At step 1706 the third conductive layer 816 can be formed on the surface of the second laminate layer 810, such as any patches associated with an AMC cell.

At step 1708 the third laminate layer 808 can be formed on the second laminate layer 810.

At step 1710, after all three of the laminate layers 812, 810, and 808 are formed by a stacking process of dielectric material, all of the stems for EBG structure can be metalized through the three laminate layers.

At step 1712, the fourth conductive layer features can be formed, such as the transmit 802 and receive 806 antennas, and any patches associated with an AMC cell.

At step 1714, the radar transmission and reception integrated circuit 824 can be formed at any time before the formation of the laminate and conductive layers of the packaged radar system.

At step 1716, the radar transmission and reception integrated circuit 824 can be attached to a bottom surface of the laminate and conductive layers of the packaged radar system.

At step 1718, the ball grid features 814A and 814B can also be applied.

At step 1720, the completed packaged radar system can be electrically tested.

At step 1722, the tested packaged radar system can be finally inspected and the fabrication method is completed.

The method described above can be extended to include formation of additional layers part of or on top of the packaged radar system, for example the formation of a radome, and to include other processing steps such as formation of vias and contacts between and within the various conductive and laminate layers.

The packaged radar system described above can be used in a number of applications such as automotive radar, industrial radar, gesture sensors, medical applications, through-wall detections and motion detectors. Sensing applications include level monitoring in storage tanks, smart lighting control, security systems, intelligent door openers, and collision avoidance in vehicles, among others. Multi-channel radar systems are primarily used instead of single-channel systems when detection of the angular position of an object is important. In telecommunication applications, for example, in applications that use high frequencies such as $5^{th}$ generation (5G) mobile technologies at 28 GHz, multi-channel transceivers may be used for point-to-point communication where beam forming is needed.

In a multichannel implementation such as a gesture sensor system that has multiple antenna elements, the size and spacing of the antenna elements are based on the desired operational frequency. For example, at 60 GHz, the distance between two antenna elements may be 3 to 3.5 mm.

As previously described, multiple antenna elements may interfere with one another and other electronic components within a radio frequency device package if the antenna elements are spaced closely together. In some cases this can limit the overall size of the radio frequency device package. The previously described embodiments provide various advantages over conventional radio frequency device packages by utilizing a wall of columns of cells to isolate antenna elements in the radio frequency device package.

Separate transmit and receive antennas have been shown and described. In other embodiments, one or more of the transmit or receive antennas may be transceivers configured to both receive and transmit radio signals. The antennas may comprise a conductive material in various embodiments. For example, in one embodiment, the antennas comprise copper (Cu). Antennas made from different conductive materials may be present in the same radio frequency device package in some embodiments.

The dimensions of the previously described antennas may be determined by a desired response to a specific wavelength or grouping of wavelengths (e.g. frequency band). In various embodiments, an antenna sensitive to millimeter wavelength radiation may have a length and width between 1 mm and 2.5 mm. In one embodiment, the length of the antenna is about 1.5 mm and the width of the antenna is about 850 µm. In an alternative embodiment, the length of the antenna is about 1.3 mm and the width of the antenna is about 1.2 mm.

The integrated circuit chip previously described may include active and passive devices, metal layers, dielectric layers, doped and intrinsic semiconductor regions, and redistribution layers as well as other components known in the art. In various embodiments, the integrated circuit chip has already undergone back end of line (BEOL) processing before being attached to the radio frequency device package.

The integrated circuit chip may also contain radio frequency circuitry. In various embodiments, the radio frequency circuitry is designed to operate in a super high frequency (SHF) or an extremely high frequency (EHF) regime. For example, the integrated circuit chip 10 may contain millimeter wave (MMW) circuitry designed to operate in the unlicensed band from 57 GHz to 64 GHz. Additionally or alternatively, the integrated circuit chip may contain circuitry designed to operate in the 28 GHz regime (in 5G applications, for example). The integrated circuit chip may have a receive interface connected to receiving antennas and/or a transmit interface connected to transmitting antennas. In some configurations, a receive interface and a transmit interface may be combined into a single interface. The integrated circuit chip may also include one or more redistribution layers (RDLs) to redistribute connections to allow coupling to one or more of the first conductive layers.

The solder balls previously described may be part of a ball grid array (BGA) for embedded wafer level ball grid array (eWLB) packaging, for example. The solder balls may allow electrical coupling between circuitry on the integrated circuit chip and the antenna substrate such as ground planes, for example.

The vertical thickness of the laminate layers may be between 100 and 300 µm in various embodiments. In one embodiment, the vertical thickness of a laminate layer is about 200 µm. In other embodiments, the vertical thickness of a laminate layer is between 50 µm and 150 µm. In one other embodiment, the vertical thickness of a laminate layer is about 60 µm. The vertical thickness of the first laminate layer may be chosen to optimize transmission line properties in the radio frequency device package.

In various embodiments, the radio frequency device package may also include additional packaging material around the integrated circuit chip and the antenna substrate. For example, a plastic, epoxy, resin, or other suitable material may be used to encapsulate the integrated circuit chip on the bottom of the radio frequency device package. In some embodiments, the integrated circuit chip may be enclosed on all sides. Alternatively, a surface of the integrated circuit chip may be left exposed. The exposed surface of the integrated circuit chip may contain additional external connections.

The method steps described above are representative of one possible method of forming a radio frequency device package, but other variations may exist. For example, the antennas and conductive barriers may be formed on the antenna substrate before forming the integrated circuit chip. The integrated circuit chip may also be attached at any time during the formation process. Additional steps may also be added to form other elements described in previous embodiments. Additional steps may also include additional packaging and/or attachment of the radio frequency device package to an external support. Other variations will be apparent by one skilled in the art.

It should be noted that the designations of "top" and "bottom" in reference to features of the invention are convenient labels and do not necessarily reflect the orientation of the features in all embodiments. For example, it may be conceivable for the embodiment radio frequency device packages described herein to be mounted with the top surface facing an external support. Therefore in some cases the top surface may more accurately be described as the bottom surface of the device package. Similarly, the radio frequency device packages may be attached at an angle relative to an external support or casing.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A packaged radar comprising:
a plurality of laminate layers;
a ground plane associated with at least one of the laminate layers;
a transmit antenna and a receive antenna associated with at least one of the laminate layers; and
an electromagnetic band gap structure arranged between the transmit antenna and the receive antenna for isolating the transmit antenna and the receive antenna, the electromagnetic band gap structure comprising a plurality of elementary cells forming a plurality of adjacent columns each coupled to the ground plane, and each elementary cell comprising a conductive planar element and a columnar element coupled to the conductive planar element,
wherein, in a plan view, the electromagnetic band gap structure further comprises a conformal wall of only one, two, or three rows of adjacent columns between the transmit antenna and the receive antenna, wherein the transmit antenna and the receive antenna are coplanar, and wherein a trajectory of the conformal wall follows a layout determined by a placement of the transmit antenna and a placement of the receive antenna.

2. The packaged radar of claim 1, wherein each column comprises a planar element at a first depth, wherein the transmit antenna and the receive antenna are at a second depth, wherein the first and second depths are measured with respect to a main surface of the packaged radar, and wherein the first depth is less than the second depth.

3. The packaged radar of claim 1, wherein each column comprises a planar element at a first depth with respect to a main surface of the packaged radar, and wherein the transmit antenna and the receive antenna are also located at the first depth.

4. The packaged radar of claim 1, wherein at least one of the columns comprises a single elementary cell.

5. The packaged radar of claim 1, wherein at least one of the columns comprises a plurality of stacked elementary cells.

6. The packaged radar of claim 1, wherein at least two of the adjacent columns comprise conductive planar elements that are laterally capacitively coupled together.

7. The packaged radar of claim 1, wherein at least two conductive planar elements within a column comprise different lateral dimensions.

8. The packaged radar of claim 1, wherein at least two conductive planar elements within a column comprise identical lateral dimensions.

9. The packaged radar of claim 1, wherein the plurality of columns of the electromagnetic band gap structure are arranged along a rectilinear path.

10. The packaged radar of claim 1, wherein the plurality of columns of the electromagnetic band gap structure are arranged along a non-rectilinear path.

11. The packaged radar of claim 1, wherein the conductive planar elements comprise a rectangular, elliptical, or polygonal shape.

12. The packaged radar of claim 1, further comprising at least one additional layer over a top surface of the packaged radar.

13. The packaged radar of claim 1, further comprising a radome over a top surface of the packaged radar.

14. A packaged radar comprising:
a ground plane;
a transmit antenna and a receive antenna; and
an electromagnetic band gap structure arranged between the transmit antenna and the receive antenna and coupled to the ground plane for isolating the transmit antenna and the receive antenna, the electromagnetic band gap structure comprising a plurality of adjacent columns each comprising at least one conductive planar element and at least one columnar element coupled to the at least one conductive planar element,
wherein, in a plan view, the electromagnetic band gap structure further comprises a conformal wall of only one, two, or three rows of adjacent columns between the transmit antenna and the receive antenna, wherein the transmit antenna and the receive antenna are coplanar, and wherein a trajectory of the conformal wall follows a layout determined by a placement of the transmit antenna and a placement of the receive antenna.

15. A method of manufacturing a packaged radar comprising:
forming a plurality of laminate layers;
forming a ground plane on at least one of the laminate layers;
forming a transmit antenna and a receive antenna on at least one of the laminate layers; and
arranging an electromagnetic band gap structure between the transmit antenna and the receive antenna for isolating the transmit antenna and the receive antenna, the electromagnetic band gap structure comprising a plurality of elementary cells forming a plurality of adjacent columns each coupled to the ground plane, and each elementary cell comprising a conductive planar element and a columnar element coupled to the conductive planar element,
wherein, in a plan view, the electromagnetic band gap structure further comprises a conformal wall of only one, two, or three rows of adjacent columns between the transmit antenna and the receive antenna, wherein the transmit antenna and the receive antenna are coplanar, and wherein a trajectory of the conformal wall follows a layout determined by a placement of the transmit antenna and a placement of the receive antenna.

16. The method of claim 15, wherein each column comprises a planar element formed at a first depth, wherein the transmit antenna and the receive antenna are formed at a second depth, wherein the first and second depths are measured with respect to a main surface of the packaged radar, and wherein the first depth is less than the second depth.

17. The method of claim 15, wherein each column comprises a planar element formed at a first depth with respect to a main surface of the packaged radar, and wherein the transmit antenna and the receive antenna are also formed at the first depth.

18. The method of claim 15, wherein at least one of the columns is formed of a single elementary cell.

19. The method of claim 15, wherein at least one of the columns is formed of a plurality of stacked elementary cells.

20. The method of claim 15, wherein conductive planar elements of at least two of the adjacent columns are laterally capacitively coupled together.

21. The packaged radar of claim 15, wherein at least two conductive planar elements within the column are formed having different lateral dimensions.

22. The packaged radar of claim 15, wherein at least two conductive planar elements within the column are formed having the same lateral dimensions.

* * * * *